US008319638B2

(12) United States Patent
Smith

(10) Patent No.: US 8,319,638 B2
(45) **Date of Patent: *Nov. 27, 2012**

(54) MOTION DETECTOR FOR DETECTING TAMPERING AND METHOD FOR DETECTING TAMPERING

(75) Inventor: Richard A. Smith, El Dorado Hills, CA (US)

(73) Assignee: Honeywell International Inc., Morristown, NJ (US)

(*) Notice: Subject to any disclaimer, the term of this patent is extended or adjusted under 35 U.S.C. 154(b) by 980 days.

This patent is subject to a terminal disclaimer.

(21) Appl. No.: 11/940,250

(22) Filed: Nov. 14, 2007

(65) Prior Publication Data

US 2010/0283611 A1 Nov. 11, 2010

(51) Int. Cl.

| | |
|---|---|
| ***G08B 1/08*** | (2006.01) |
| ***G08B 13/08*** | (2006.01) |
| ***G08B 21/00*** | (2006.01) |
| ***G08B 23/00*** | (2006.01) |
| ***B60R 25/10*** | (2006.01) |
| ***G01J 5/02*** | (2006.01) |

(52) U.S. Cl. .................. 340/541; 340/545.1; 340/545.3; 340/660; 340/517; 340/426.26; 340/539.23; 340/539.31; 340/521; 340/522; 340/523; 250/342

(58) Field of Classification Search .......... 340/553–557, 340/565–567, 426.26, 539.23, 539.31, 541, 340/545.3, 545.4, 660, 683, 500, 501, 506, 340/507, 517–530, 511, 6; 348/148, 143, 348/152–155; 250/221–224, DIG. 1, 342
See application file for complete search history.

(56) References Cited

U.S. PATENT DOCUMENTS

| | | | | |
|---|---|---|---|---|
| 3,544,988 | A * | 12/1970 | Astheimer | 340/600 |
| 3,680,047 | A * | 7/1972 | Perlman | 340/556 |
| 3,988,570 | A * | 10/1976 | Murphy et al. | 235/382 |
| 4,622,541 | A * | 11/1986 | Stockdale | 340/566 |
| 4,752,768 | A * | 6/1988 | Steers et al. | 340/567 |
| 4,857,912 | A * | 8/1989 | Everett et al. | 340/508 |
| 4,882,567 | A * | 11/1989 | Johnson | 340/522 |
| 5,091,648 | A * | 2/1992 | Owers et al. | 250/342 |
| 5,510,765 | A * | 4/1996 | Madau | 340/541 |
| 5,608,377 | A * | 3/1997 | Zhevlev et al. | 340/506 |
| 5,748,083 | A * | 5/1998 | Rietkerk | 340/568.2 |
| 6,191,688 | B1 * | 2/2001 | Sprouse | 340/506 |
| 6,281,787 | B1 * | 8/2001 | Lerg et al. | 340/442 |
| 6,351,234 | B1 * | 2/2002 | Choy | 342/53 |
| 6,529,129 | B1 * | 3/2003 | Tomooka | 340/556 |
| 7,259,658 | B2 * | 8/2007 | Noguchi et al. | 340/426.26 |
| 7,414,236 | B2 * | 8/2008 | Wipiejewski | 250/221 |
| 7,852,210 | B2 * | 12/2010 | Merritt et al. | 340/540 |

(Continued)

*Primary Examiner* — Daniel Wu
*Assistant Examiner* — Muhammad Adnan
(74) *Attorney, Agent, or Firm* — Husch Blackwell

(57) ABSTRACT

A motion detector and a method for detecting a tampering of the motion detector. The tampering can include a spraying or brushing of a lens of the motion detector. The motion detector comprises a lens, a single sensing section for detecting infrared signals within a protected area, and detecting vibrations on the lens in the form of acoustic signals, the vibrations and the infrared signal causing a voltage change in the single sensing section, a first and second amplifier for amplifying the voltage change for processing for tampering and motion, respectively, first and second filter for filtering the voltage change for processing for tampering and motion, respectively, a microcontroller for determining if the detected voltage change is consistent with a pattern that is indicative of tampering or motion and alarm generating section for generating a tamper alarm or a motion alarm based upon the determination by the microprocessor.

10 Claims, 4 Drawing Sheets

U.S. PATENT DOCUMENTS

2005/0089193 A1* 4/2005 Kaushal et al. ............... 382/103
2005/0128093 A1* 6/2005 Genova et al. ................ 340/577
2006/0109114 A1* 5/2006 Watts et al. ................ 340/568.1
2007/0247526 A1* 10/2007 Flook et al. .................. 348/161
2008/0084292 A1* 4/2008 DiPoala ........................ 340/522

* cited by examiner

MOTION DETECTOR FOR DETECTING TAMPERING AND METHOD FOR DETECTING TAMPERING

FIELD OF THE INVENTION

The present invention relates generally to sensors and security systems. More particularly, the present invention relates to a detector that includes a sensing element adapted for detecting a motion within a given area and tampering of the detector.

BACKGROUND

Sensors are used to detect events such as a glass break, motion, asset movement, temperature and impact/shock. These sensors can be used as a standalone device or in combination with a security system. A security system includes a life, safety, and property protection system. The sensors communicate with a control panel when the sensor detects an event.

Motion sensors or detectors can be masked. Masking of the detector prevents the sensor from correctly detecting motion within a protected area. Spraying or brushing a coating or film on a lens that blocks the infrared signal can mask a detector, such as a PIR sensor.

Currently, masking is detected by employing multiple sensors to detect signals indicative of the masking. However, this method requires deployment of multiple sensors in an area, where one sensor detects motion and the other sensors are dedicated for the purposes of detecting masking.

SUMMARY OF THE INVENTION

The present invention discloses a motion detector that is capable of detecting both masking of a lens and motion within a given protected area. The masking is in the form of spraying or brushing a coating on the lens for the purposes of blocking signals from reaching a sensing element.

Disclosed is a motion detector for detecting a tampering. The motion detector comprises a lens for focusing infrared signals into an specific area, a sensing section for detecting the focused infrared signals and detecting vibrations on the lens, the vibrations and the infrared signal causes a voltage change in the sensing section, a first amplifier for amplifying the voltage change for processing for tampering, a second amplifier for amplifying the voltage change for processing for motion, a first filter for filtering the voltage change for processing for tampering, a second filter for filtering the voltage change for processing for motion, a microcontroller for determining if the detected voltage change is consistent with a pattern that is indicative of tampering and alarm generating section for generating a tamper alarm based upon the determination by the microcontroller.

BRIEF DESCRIPTION OF THE DRAWINGS

These and other features, benefits, and advantages of the present invention will become apparent by reference to the following text and figures, with like reference numbers referring to like structures across the view, wherein.

DETAILED DESCRIPTION OF THE INVENTION

Figure 1:
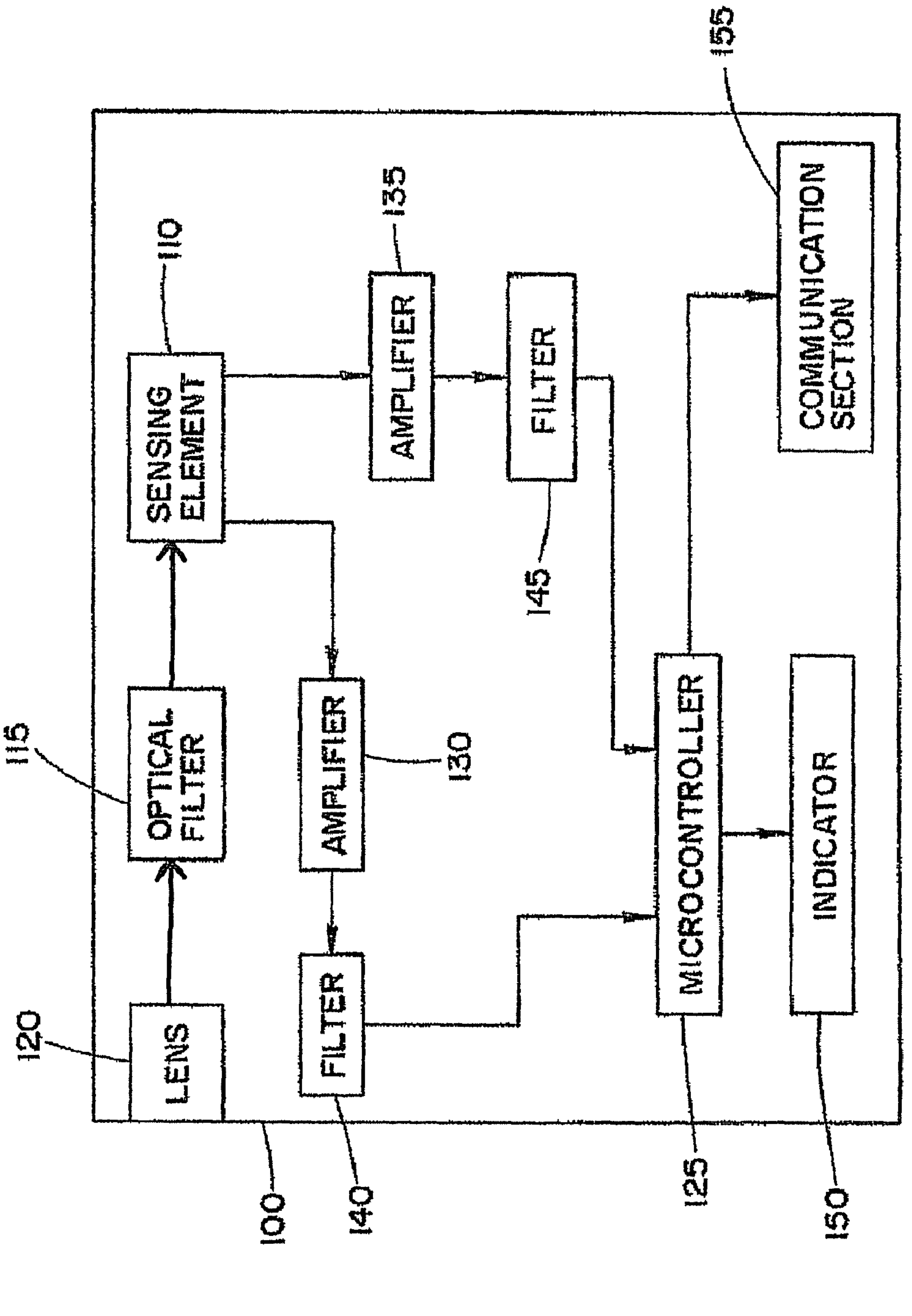
FIG. 1 is a block diagram of the motion detector in accordance with an embodiment of the invention.

In accordance with the invention, the motion detector 100 (as depicted in FIG. 1) is adapted to detect tampering with the motion detector 100. The motion detector 100 is capable of detecting either a spraying or brushing of a coating on a lens where the spraying or brushing prevents an accurate detection of motion. The motion detector 100 examines or analyzes characteristics of a change in a voltage of a sensing element 110 to determine if a change is indicative of either a brushing or a spraying.

FIG. 1 illustrates a block diagram of the motion detector 100. The motion detector 100 includes a sensing element 110, an optical filter 115, a lens 120, a microcontroller 125, two amplifiers (130, 135), two filters (140, 145) and an indicator 150. Additionally, the motion detector 100 can include a communication section 155 for transmitting or receiving signals from a security system as will be described in detail later. Additionally, the motion detector 100 will include a power source (not shown). The power source can be an internal power source such as a battery. In another embodiment the microcontroller 125 can perform the filtering without the use of separate filters. In another embodiment, the same amplifier can be used to amplify the signals from both detection channels, i.e., tampering and motion and the microcontroller filters the signal.

In an embodiment, a Far Infrared (FAR) filter can be used as the optical filter. The motion detector 100 can be a passive infrared detector (PIR). A PIR is responsive to infrared light radiating from objects in a field of view. Motion is detected when an infrared emitting source with one temperature, such as a human body passes in front of a source with another temperature. Motion is detected based on the difference in temperature. The speed of the motion can be detected as a function of the frequencies of the signals received by the sensing element 110. Other types of motion detectors, which are also shock sensitive can be used.

In an embodiment of the invention, the sensing element 110 is constructed from a solid-state sensor. More than one solid-state sensor can be used for the sensing element 110. The sensing element 110 can be manufactured using a material that has both pyro-electric and piezo-electric properties. For example, the sensing element can be constructed from Lithium tantalate ($LiTaO_3$) which is a crystal exhibiting both piezo-electric and pyro-electric properties. However, other materials can be used. Lithium tantalate is presented only as an example and is not an exhaustive list of all of the materials. The sensing element 110 is located within a housing of the motion detector 100.

The voltage that is caused by either a spraying or brushing of a coating on the lens is very small and, therefore, the voltage change must be amplified. The voltage change caused by a spraying exhibits different characteristics than a voltage change caused by a brushing. In one embodiment, the gain for the amplification of the voltage change (for tampering processing) is the same for both spraying and brushing. In another embodiment, the gain can be different for the voltage change for spraying and brushing. The gain of the amplifier is variable and can be controlled to vary the sensitivity of the motion detector. For example, a gain can be set at 33000. Amplifier 135 is a dedicated amplifier used to amplify the voltage change for tampering processing. Amplifier 130 is a dedicated amplifier used to amplify the voltage change for motion processing. In an embodiment, the amplification process uses two amplification stages.

A lens 120 is placed in front of the sensing element 110 to focus the energy onto the sensing element 110. For example, motion detector 100 can have a Fresnel lens molded externally. The infrared energy or signal will enter the housing of the intrusion detector only through the lens 120.

In an embodiment, the lens 120 is adapted to filter the infrared signal. The filter will ideally pass a signal in the range of 750 nm to 1 mm in wavelength, consistent with the "black-body radiation" given off by humans. However, if the lens is sprayed or brushed with a coating, a signal will not pass through. In another embodiment, a separate optical filter 115 (as illustrated in FIG. 1) is placed over the sensing element 110. The optical filter 115 functions in the same manner as a lens having additional filtering capability.

Even if a separate optical filter is used, if the lens 120 is sprayed or brushed with a coating, a signal will not pass through.

The sensing element 110 will exhibit a change in electrical properties such as change in voltage, e.g., voltage change when motion occurs or a spraying or brushing. Specifically, the sensing element 110 exhibits a change in voltage in the presence of vibrations that result from the spraying or brushing, e.g., acoustic signal.

The microcontroller 125 is configured to determine the source of the change in electrical properties, e.g., motion or tampering, and respond accordingly. The determination is based upon the rate of change, duration, and amplitude of the voltage change.

The voltage change is processed for motion and tampering using two separate channels, i.e, two different amplifiers and filters.

Additionally, a filtering occurs for the voltage change. Two filters (140, 145) are used to filter the voltage change. In an embodiment, the filters are bandpass filters which are used to filter two different bands, one band representing a motion and the other band representing a tampering. The voltage change for both spraying and brushing is typically in the same frequency band. In another embodiment, a digital filter can be used to filter the voltage change.

FIG. 1 depicts that the output of the amplifiers (130, 135) are input into the filters (140, 145). However, in another embodiment, the amplifier (130, 135) and filter (140, 145) can be reversed, i.e., output of the filters (140, 145) input into amplifiers (130, 135).

The microcontroller 125 receives the amplified and filtered voltage change as an input.

Figure 2:
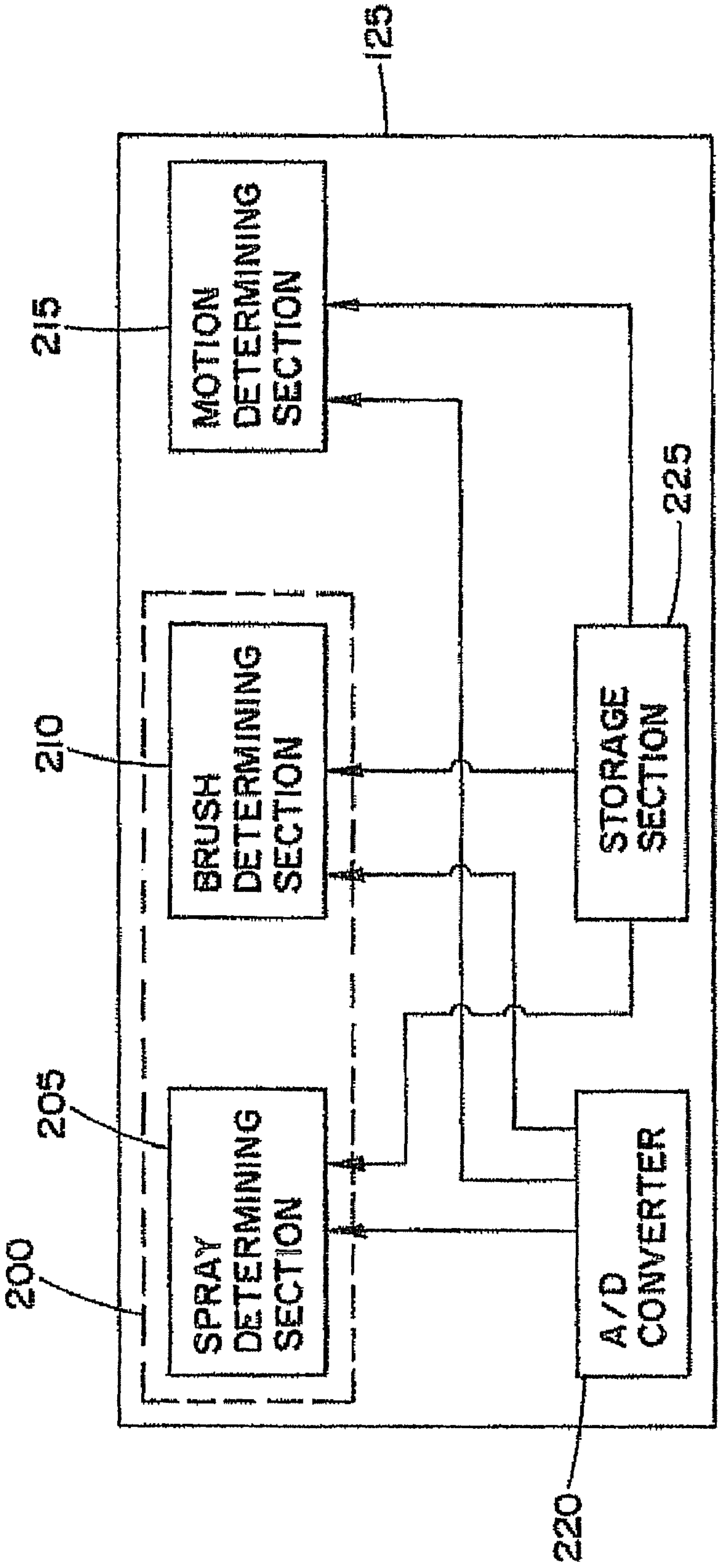
FIG. 2 illustrates a block diagram of a microprocessor of the motion detector in accordance with an embodiment of the invention.

FIG. 2 is a block diagram of functional blocks in a microcontroller in accordance with an embodiment of the invention. The microcontroller is programmed with software that enables the microcontroller 125 to perform the described functionality herein. As depicted in FIG. 2, the microcontroller 125 includes a tampering determining section 200, a motion determining section 215, an A/D converter 220, and a storage section 225. The tampering determining section 200 includes a spraying determining section 205, and a brushing determining section 210. Each determining section (205, 210, 215) compares characteristics of a detected voltage change with preset threshold values, i.e., known patterns.

The storage section 225 includes all preset thresholds, such as rate of change, duration, and the amplitude thresholds for the determining whether the voltage change is indicative of motion or tampering. The storage section 225 can be any type of memory.

There are three amplitude thresholds: 1 for motion and 2 for tampering. Additionally, there are three duration thresholds: 1 for motion and 2 for tampering. Spraying and brushing exhibits different characteristics and requires two different thresholds. A brushing of a coating may exhibit a longer and stronger voltage change then a spraying.

Figure 4:
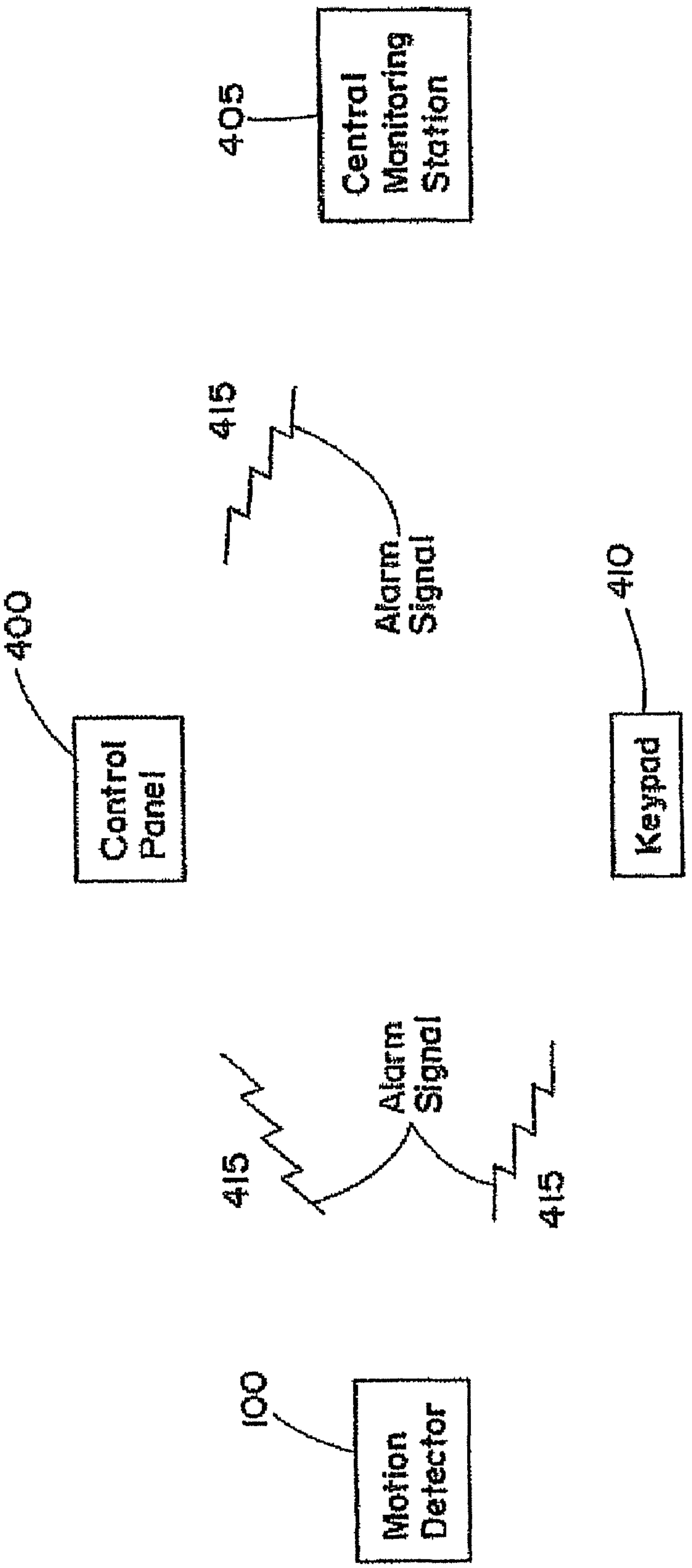
FIG. 4 illustrates a block diagram of a security system with the motion detector in accordance with an embodiment of the invention.

As depicted in FIG. 1, the indicator 150 outputs a signal indicative of an alarm condition. The indicator 150 can be a light emitting diode (LED), a speaker or a relay. Additionally, a communication section 155 can be used to send an alarm signal 415 or code to a control panel 400 (as depicted in FIG. 4). Additionally, a wired communication path, such as a system communication bus can be used to transmit a code.

An LED or a speaker is positioned to be a visual or audible signal to a person within a protected premises to notify them of an alarm condition, i.e., motion and/or tampering. The indicator 150 is capable of output at least two different indications, a first indication indicating motion and a second indication indicating tampering. In another embodiment, the indicator 150 can have different indications for spraying and brushing.

Figure 3:
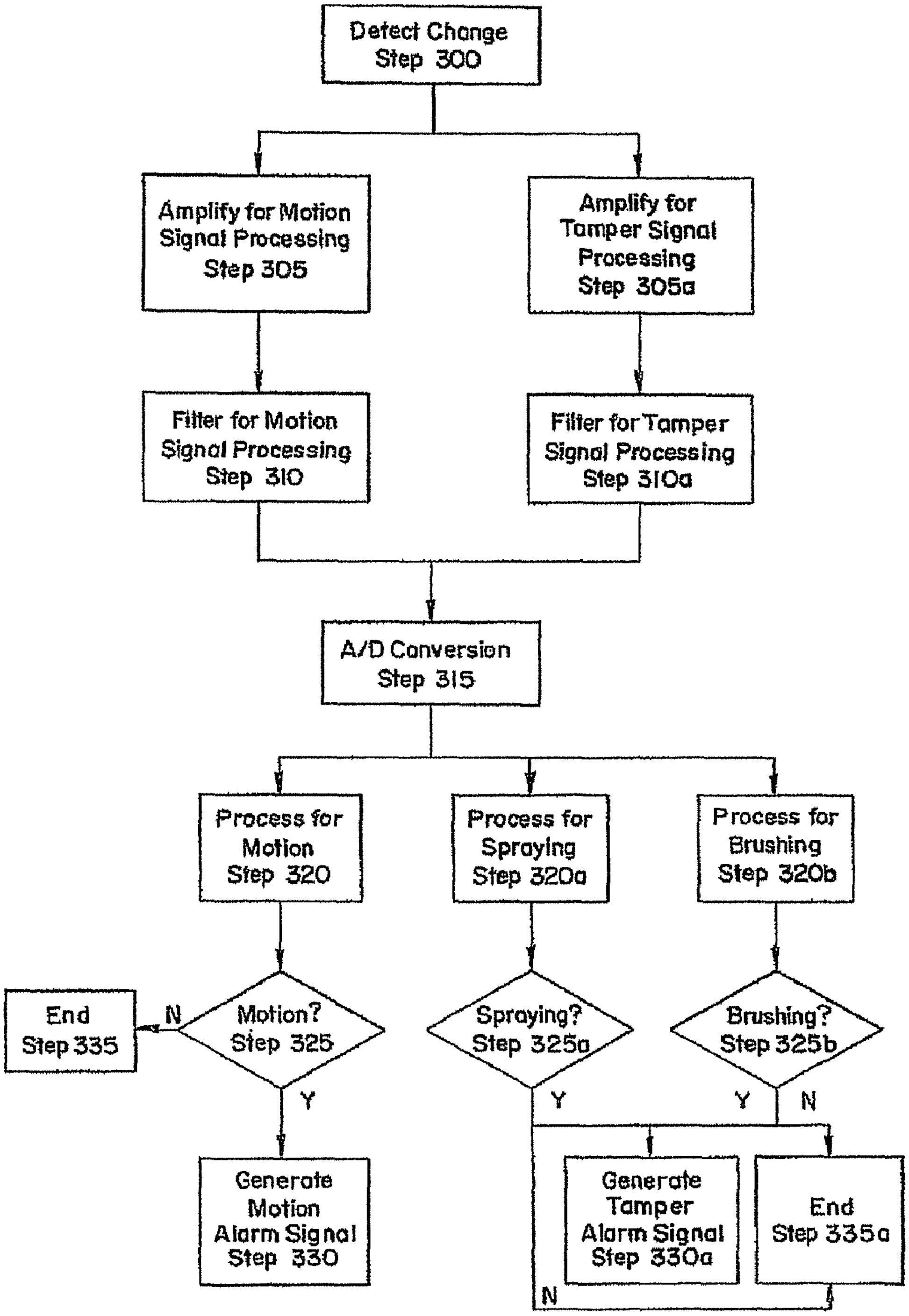
FIG. 3 illustrates a flow chart for the detection method in accordance with an embodiment of the invention.

FIG. 3 illustrates a flow chart for an tampering detection method according to an embodiment of the invention.

At step 300, a voltage change in the sensing element 110 is detected. In an embodiment of the invention, the voltage change is measured at a source terminal of a source follower. According to an embodiment of the invention, the voltage change is processed in parallel for either motion or tampering. At steps 305 and 305*a*, the voltage change is amplified. The amplification for motion is different than the amplification for tampering. In an embodiment, the amplification for motion uses a gain of 10000, whereas the gain for tampering can be 33000. At steps 310 and 310*a*, the amplified voltage change is filtered for motion and tampering, respectively. In an embodiment of the invention, two different band pass filters are used, e.g., (140, 145).

At step 315, the amplified and filtered voltage changes, i.e., one for motion processing and the other for tampering processing, are converted into a digital signal for processing by a microcontroller 125.

At steps 320, 320*a* and 320*b*, the digitized signals are processed for motion, spraying and brushing, respectively. The processing of the digitized voltage change evaluates the amplitude, frequency, and duration of the detected voltage change. The frequency of a voltage change that is caused by tampering is different from a frequency of the voltage change that is caused by motion. Additionally, as described above, the amplitude and duration of a voltage change that is caused by a spraying of a coating on a lens is different from the amplitude and duration of the voltage change that is caused by brushing.

At step 320, the motion determining section 215 processes the digital representation of the voltage change for motion. The motion determining section 215 receives as inputs a digital representation of the voltage change (amplified and filtered) and the preset amplitude and duration thresholds. The motion determining section 215 compares the digital representation of the voltage change with both the amplitude and duration thresholds. If the digital representation of the voltage change is indicative of motion, e.g., meets both thresholds, at step 325, an alarm is generated, at step 330. Specifically, the indicator 150 outputs a first signal indicating that motion has been detected. Additionally, the communication section 155 can transmit a first signal to a control panel 400.

If at step 325, the digital representation of the voltage change is not indicative of motion, motion processing phase ends, at step 335.

At step 320*a*, the spray determining section 205 processes the digital representation of the voltage change for spraying of the lens 120. The spray determining section 205 receives as inputs a digital representation of the voltage change (amplified and filtered) and the preset amplitude and duration thresholds. At step 320*a*, the spray determining section 205 compares the digital representation of the voltage change with both the amplitude and duration thresholds stored in the storage section 225 for spraying. If the digital representation of the voltage change is indicative of spraying, e.g., meets both thresholds, at step 325*a*, an alarm is generated, at step 330*a*. Specifically, the indicator 150 outputs a second signal indicating that a spraying of the lens 120 has been detected. Additionally, the communication section 155 can transmit a second signal to a control panel 400.

If at step 325*a*, the digital representation of the voltage change is not indicative of motion, motion processing phase ends, at step 335*a*.

At step 320*b*, the brush determining section 210 processes the digital representation of the voltage change for brushing of a coating of the lens 120. The brush determining section 210 receives as inputs a digital representation of the voltage change (amplified and filtered) and the preset amplitude and duration thresholds. At step 320*b*, the brush determining section 210 compares the digital representation of the voltage change with both the amplitude and duration thresholds stored in the storage section 225 for spraying. If the digital representation of the voltage change is indicative of brushing, e.g., meets both thresholds, at step 325*b*, an alarm is generated, at step 330*a*. Specifically, the indicator 150 outputs a second signal indicating that a spraying of the lens 120 has been detected. Additionally, the communication section 155 can transmit a second signal to a control panel 400.

If at step 325*b*, the digital representation of the voltage change is not indicative of motion, motion process phase ends, at step 335*a*. In another embodiment, if at step 325*b* the digital representation of the voltage change is indicative of brushing, e.g., meets both thresholds, a different alarm signal can be generated, e.g., a third alarm signal. Further, the communication section 155 can transmit a third signal to a control panel 400.

FIG. 4 illustrates an exemplary security system with the motion detector 100 according to an embodiment of the invention.

As depicted, the motion detector 100 can transmit an alarm signal 415 (referenced generically in FIG. 4) to a control panel 400. As described herein the alarm signal 415 indicates that either motion or a tampering has been detected. In accordance with the invention, a first signal, a second signal, and a third signal can been sent by the motion detector 100 as the alarm signal 415. Alternatively, the motion detector 100 can transmit the alarm signal 415 to a security system keypad 410. Additionally, the control panel 400, upon receipt of the alarm signal 415 can relay the alarm signal to a central monitoring station 405 and a relayed alarm signal 415*a*. Additionally, the motion detector 100 may transmit an alarm to a remote keyfob, using the communication section 155. A property owner will be able to receive alerts and updates regarding a tampering of the motion detector 100 on a bidirectional keyfob.

The invention has been described herein with reference to a particular exemplary embodiment. Certain alterations and modifications may be apparent to those skilled in the art without departing from the scope of the invention. The exemplary embodiments are meant to be illustrative, not limiting of the scope of the invention, which is defined by the appended claims.

What is claimed is:

1. A method for detecting tampering of a motion sensor comprising the steps of:

providing a lens through which energy passes;

focusing the energy passing through the lens onto a single Sensing element;

detecting a single voltage change in the single sensing element;

filtering the voltage change by filtering out a portion of the voltage change outside of a first bandwidth, the first bandwidth including a frequency band consistent with motion detection;

filtering the voltage change by filtering out a portion of the voltage change outside of a second bandwidth, the second bandwidth including a frequency band consistent with spraying on the lens and with brushing on the lens;

evaluating at least one of a rate of change, duration, and amplitude of the voltage change in the first bandwidth and of the voltage change in the second bandwidth;

comparing the at least one of the rate of change, the duration, and the amplitude of the voltage change in the first bandwidth with first predetermined threshold values to determine if the at least one of the rate of change, the duration, and the amplitude of the voltage change in the first bandwidth is indicative of motion and the at least one of the rate of change, the duration, and the amplitude of the voltage change in the second bandwidth with second predetermined threshold values to determine if the at least one of the rate of change, the duration, and the amplitude of the voltage change in the second bandwidth is indicative of spraying or brushing; and generating an alarm signal based upon the comparing.

2. The method for detecting a tampering of a motion sensor according to claim 1, further comprising:

amplifying the voltage change using a first preset gain.

3. The method for detecting a tampering of a motion sensor according to claim 1, further comprising:

amplifying the voltage change using a second preset gain.

4. The method for detecting a tampering of a motion sensor according to claim 1, wherein the generating step comprises the step of generating a first alarm signal if the voltage change has characteristics indicative of tampering, and a second alarm signal if the voltage change has characteristics indicative of motion.

5. The method for detecting a tampering of a motion sensor according to claim 4, wherein said first alarm signal is different from the second alarm signal.

6. The method for detecting a tampering of a motion sensor according to claim 5, further comprising the step of transmitting the first alarm signal and second alarm signal to a control panel.

7. The method for detecting a tampering of a motion sensor according to claim 5, further comprising the step of transmitting the first alarm signal and second alarm signal to a central monitoring station.

8. A motion detector for detecting a tampering comprising:

a lens for focusing energy onto a single sensing section;

the single sensing section for detecting the focused energy from the lens, the single sensing section exhibiting a voltage change when detecting the focused energy from the lens;

a first amplifier for amplifying the voltage change in the single sensing section, the first amplifier transmitting a first amplified voltage change;

a second amplifier for amplifying the voltage change in the single sensing section, the second amplifier transmitting a second amplified voltage change;

a first filter for filtering out a portion of the first amplified voltage change outside of a first bandwidth, the first bandwidth including a frequency band consistent with motion detection, the first filter transmitting a first filtered, amplified voltage change;

a second filter for filtering out a portion of the second amplified voltage change, outside of a second bandwidth, the second bandwidth including a frequency band consistent with spraying on the lens and with brushing on the lens, the second filter transmitting a second filtered, amplified voltage change;

a microcontroller for evaluating at least one of a rate of change, duration, and amplitude of the voltage change in the first bandwidth and of the voltage change in the second bandwidth and for comparing the at least one of the rate of change, the duration, and the amplitude of the voltage change in the first bandwidth with first predetermined threshold values to determine if the at least one of the rate of change, the duration, and the amplitude of the voltage change in the first bandwidth is indicative of motion and the at least one of the rate of change, the duration, and the amplitude of the voltage change in the second bandwidth with second predetermined threshold values to determine if the at least one of the rate of change, the duration, and the amplitude of the voltage change in the second bandwidth is indicative of spraying or brushing; and an alarm generating section for generating an alarm based upon the comparison determination by the microcontroller.

9. The motion detector of claim 8, wherein said single sensing section comprising a pyro-electric sensor.

10. The motion detector of claim 8, wherein the first amplifier and the first filter are in parallel with the second amplifier and the second filter.

* * * * *